United States Patent [19]
Takagi

[11] Patent Number: 5,559,585
[45] Date of Patent: Sep. 24, 1996

[54] IMAGE FORMING APPARATUS ADAPTED FOR REFLECTION-TYPE OR TRANSMISSION-TYPE ORIGINALS

[75] Inventor: Atsushi Takagi, Kanagawa, Japan

[73] Assignee: Fuji Photo Film Co., Ltd., Kanagawa, Japan

[21] Appl. No.: 544,255

[22] Filed: Oct. 17, 1995

Related U.S. Application Data

[63] Continuation of Ser. No. 119,589, Sep. 13, 1993, abandoned.

[30] Foreign Application Priority Data

Sep. 14, 1992 [JP] Japan ................................. 4-244693

[51] Int. Cl.⁶ .................................................. G03G 15/04
[52] U.S. Cl. ........................ 355/228; 347/112; 347/241; 347/253; 355/208
[58] Field of Search ................................. 355/38, 77, 203, 355/204, 208, 210, 228, 246, 311, 326 R, 327; 347/112, 115, 118, 129, 225, 241, 244, 253, 256, 258

[56] References Cited

U.S. PATENT DOCUMENTS

| | | | |
|---|---|---|---|
| 4,080,064 | 3/1978 | Komori et al. | 355/51 |
| 4,150,894 | 4/1979 | Meyer et al. | 355/38 |
| 4,530,591 | 7/1985 | Mastuyama | 271/267 X |
| 4,656,525 | 4/1987 | Norris | 358/280 |
| 4,742,371 | 5/1988 | Furuta et al. | 355/32 X |
| 5,025,282 | 6/1991 | Nakamura et al. | 355/38 |
| 5,053,808 | 10/1991 | Takagi | 355/38 |
| 5,081,489 | 1/1992 | Ishikawa et al. | 355/200 |
| 5,084,726 | 1/1992 | Ibuchi et al. | 355/40 |
| 5,253,031 | 10/1993 | Kinoshita et al. | 355/327 |

*Primary Examiner*—Thu Anh Dang
*Attorney, Agent, or Firm*—Sughrue, Mion, Zinn, Macpeak & Seas

[57] ABSTRACT

The improved color image forming apparatus is adapted for image formation from either a reflection-type original or a transmission-type original by the user who selects the proper exposure optics (or unit) in accordance with the kind and size of the original to be duplicated. The apparatus is capable of image formation with the necessary color and/or density related adjustments being performed by basically the same operating device through basically the same operation without any regard to the kind and size of the original and the desired image of high quality can be formed by a simple method. The color and/or density related adjustment necessary for image formation with the selected exposure optics (or unit) is performed by the same input device without regard to the kind of document to be duplicated.

4 Claims, 5 Drawing Sheets

(a)

(b)

IMAGE FORMING APPARATUS ADAPTED FOR REFLECTION-TYPE OR TRANSMISSION-TYPE ORIGINALS

This is a Continuation of application Ser. No. 08/119,589, filed Sep. 13, 1993, now abandoned.

BACKGROUND OF THE INVENTION

This invention relates to an image forming apparatus that is capable of image formation not only from reflection-type originals such as printed matter and photographic documents but also from transmission-type originals such as lantern slides and proofs. The apparatus allows image of high quality to be formed from various kinds of documents by simple steps of operation whether they are of a reflection or transmission type.

Most of the conventional image forming apparatuses such as color copiers and various types of color printers have been adapted for reproducing image from reflection-type originals such as printed matter. However, the technology of recording image information has recently become so versatile that image forming apparatuses have been commercialized that are capable of image recording on light-sensitive materials by reading image not only from reflection-type originals such as printed matter and photographs but also from transmission type originals such as lantern slides, proofs and microfilms.

Image forming apparatus that is adapted for the use of both a reflection-type and a transmission-type original is equipped with a light source unit on a scanning unit that compose the exposure optics for image formation from the transmission-type original, and the user performs imagewise exposure on the light-sensitive material by means of the appropriate exposure optics as selected in accordance with the kind of document to be duplicated and the size of the transmission-type original of interest.

The image forming apparatus of this dual type performs imagewise exposure on an ordinary reflection-type original by means of exposure optics that is inherent in the apparatus and which comprises in combination a linear scanning head for issuing illuminating light, a plurality of mirrors, light modifying color filters and diaphragm, imaging lenses, etc.

To perform imagewise exposure with exposure optics inherent in the image forming apparatus (which optics in hereunder referred to as "inherent exposure optics"), the linear scanning head is moved in a direction generally perpendicular to its length so that the reflection-type original placed on the document platen is scanned two-dimensionally with the illuminating light from the head. Slit light reflected from the original is guided by the plurality of mirrors to travel in a predetermined optical path and, after being adjusted for its colors and quantity by means of the color filters and diaphragm and for the imaging position, magnification, etc. by means of the imaging lens, the light is admitted and focused at the position of imagewise exposure on the light-sensitive material that is moving in synchronism with the scanning head, thereby completing the process of exposure of the light-sensitive material.

For image formation from comparatively large transmission-type originals such as 4(in)×5(in) size lantern slides and proofs, it is known to use a dedicated light source unit that illuminates from above the transmission-type original placed on the document platen (or held in its neighborhood).

When using this light source unit, the image of the transmission type original is also read by means of the aforementioned inherent exposure optics; the light from the light source unit that has passed through the original is scanned without turning on the light source in the scanning head and, in the manner described in connection with image formation from the reflection-type original, the transmitted light is focused at the position of imagewise exposure on the light-sensitive material, thereby completing the process of exposure of the light-sensitive material.

In addition, for image formation from small-size transmission type originals such as 135 size lantern slides, it is known to use a film scanning unit having exposure optics of a projection type as disclosed in Japanese Patent Application (kokai) No. 2(1990)-242246. Being designed for use as an attachment to a predetermined part of the image forming apparatus, this film scanning unit of the projection type comprises such basic components as a projecting light source, light modifying color filters, a ND filter for adjusting the quantity of light a document holder that moves (for scanning) as it carries the transmission-type original, a slit defining member that restricts the light transmitted through the original, a zoom lens for image enlargement, and mirrors for adjusting the optical path.

The process of image formation from the transmission-type original by means of the film scanning unit proceeds as follows. Light issuing from the projecting light source that has its colors and quantity adjusted by the color filters and ND filter is allowed to be incident on the original on the document holder and the transmitted light is shaped by the slit-defining member to form elongated slit light. The document holder moves in a direction corresponding to the movement of the scanning head (in the direction of transport of the light-sensitive material) in the image forming apparatus and the slit is elongated in a direction generally perpendicular to the movement of the holder; consequently, the transmission-type original is subjected to slit scanning.

The transmitted light coming out of the slit is admitted into the zoom lens which performs image enlargement at a preset magnification and its optical path is brought into registry with that of reflected light from the reflection-type original (see the foregoing discussion) by means of the mirrors that can be inserted into or removed from the optical path in the inherent exposure optics; subsequently, as in the case of image formation from the reflection-type original, the transmitted light is incident and focused on the light-sensitive material moving in synchronism with the movement of the transmission-type original (and the document holder, too), thereby completing the process of exposure of the light-sensitive material.

A problem with these conventional image forming apparatuses such as a color copier and a color printer is that the exposure optics and the mechanism for transporting the light-sensitive and image-receiving materials can experience mechanical deviations or that the light-sensitive material and even the developing material may be subject to variations from one production lot to another, as well as time-dependent changes and deterioration and that, therefore, it is difficult to insure that image faithful to the image of the color original can always be reproduced.

Even if the same model of image forming apparatus is used and operated under the same image forming conditions with a view to forming the same image, the above-described mechanical factor, lot-to-lot variation, time-dependent changes and deterioration will affect the reproduction of image to upset the color balance or afford different densities.

Therefore, in order to insure that the conventional image forming apparatus will always form image that is faithful to the image of the original in terms of color and density, the appropriate image forming conditions, or the conditions for color balance and density that can reproduce a faithful image, must not only be set at the time when the image forming apparatus is installed or when the light-sensitive material or the image-receiving material, as well as the developing material are replaced but also be reset periodically after the installation of the apparatus.

The conventional color image forming apparatus is so adapted that the color balance, color shades, density and other factors of the image to be formed are adjusted manually in accordance with various parameters including the user's preference, the intended use of the formed image, and the state of the image of the original.

However, in the conventional color image forming apparatus that is designed to duplicate image from both a reflection-type and a transmission-type original, not only the method of setting or resetting the image forming conditions but also the method of adjusting the image color and/or density manually (which is hereunder referred to as "color/density adjustment") varies, with the exposure optics or unit to be employed, namely, with the kind of document to be duplicated, and the user has found the steps of operation for setting the image forming conditions or performing color/density adjustment to be not only extremely inefficient but also cumbersome and difficult to perform.

When duplicating image from color reflection-type original on the conventional image forming apparatus, the image forming conditions are typically set in the following manner: the intended image is actually formed using predetermined reference charts and, with the formed image being visually inspected or electronically read with a sensor or the like, the operating panel on the image forming apparatus is touched to adjust the amount of insertion of various color [i.e., cyan (C), magenta (M) and yellow (Y)] filters fitted in the inherent exposure optics, as well as the amount of control by the diaphragm and the so adjusted values are entered into the apparatus for storage as data.

Image formation is also accomplished by means of a light source unit using a sleeve or the like. In this case, inherent exposure optics is also used but, on the other hand, it is impossible to preset the conditions for image formation from a transmission-type original. To form image of high quality, the user must check the actually formed image and repeat the routine for another image formation by touching the operating panel inherent in the apparatus to make the necessary adjustments of colors, densities, etc.

When a film scanning unit is used to perform image formation from a small-size transmission-type original such as a lantern slide, the necessary image forming conditions are preset by means of the color (C, M and Y) filters and the ND filter for adjusting the intensity of light, all of which filters are fitted in the film scanning unit; however, in practice, in order to adjust or preset the image forming conditions using those filters, the operating means on the film scanning unit must be touched in an operational manner entirely different from the one used in image formation from a reflection-type original or a large-size transmission-type original.

This is also true in the case of performing color/density adjustment in accordance with the intended use of the formed image or the state of document to be duplicated; when forming image from a reflection-type original or a large-size transmission-type original, the necessary adjustment is accomplished by the operating panel inherent in the apparatus whereas the adjusting means fitted in the film scanning unit is used to achieve the adjustment of interest for a small-size transmission-type original such as a lantern slide.

In short, the conventional image forming apparatuses require entirely different methods of operation for adjusting the image forming conditions or making the necessary color/density adjustments for image formation depending not only upon the kind and size of the document to be duplicated but also upon the exposure optics to be selected accordingly, and this has presented the user with a serious problem in that he finds the steps of operation for the image forming process extremely cumbersome and difficult to perform.

SUMMARY OF THE INVENTION

The present invention has been accomplished under these circumstances and has as an object providing a color image forming apparatus that is adapted for image formation from either a reflection-type original or a transmission-type original by the user who selects the proper exposure optics (or unit) in accordance with the kind and size of the original to be duplicated, said apparatus being characterized in that it is capable of image formation with the necessary color and/or density related adjustments being performed by basically the same operating means through basically the same operation without any regard to the kind and size of the original and in that the desired image of high quality can be formed by a simple method.

This object of the present invention can be attained by an image forming apparatus that comprises an imagewise exposing section that has a plurality of exposure optics for selective use depending upon whether the document to be duplicated is a reflection-type or a transmission-type original and in which the latent image of said document is formed on a light-sensitive material by scanning exposure, a light-sensitive material feed section where said light-sensitive material is fed to a predetermined position for imagewise exposure, a developing section where the exposed light-sensitive material is subjected to a development process, and input means for selecting the appropriate exposure optics in accordance with the kind of document to be duplicated and for performing the steps of operation for color and/or density related adjustment during image formation by means of the selected exposure optics, the color and/or density related adjustment during image formation being performed by said input means without regard to the king of document to be duplicated.

In a preferred embodiment, the exposure optics is triplex and consists of the following three types: inherent exposure optics that is composed of a light source for reading a reflection-type original and imaging optics with which the light issuing from said light source that has been reflected by said reflection-type original is focused on the light-sensitive material; exposure optics for transmission-type originals that has a projecting light source for reading a transmission-type original and projecting optics with which the light issuing from said light source that has passed through said transmission-type original is focused on the light-sensitive material; and exposure optics that employs an illuminating light source for reading the transmission-type original and the imaging optics which is part of said inherent exposure optics.

In another preferred embodiment, the range of color and/or density related adjustment by the input means is variable with the kind of document to be duplicated.

The image forming apparatus of the present invention performs image formation with the appropriate exposure optics being selected in accordance with the kind of document to be duplicated (whether it is a reflection-type or a transmission-type original) and its size. For example, the exposure optics inherent in the image forming apparatus is selected for image formation from a reflection-type original; to form image from a 4×5 size lantern slide, a proof or other transmission-type originals, a transmitting light source unit that is positioned above the document platen inherent in the image forming apparatus and which illuminates the transmission-type original placed on the platen, as well as the exposure optics inherent in the image forming apparatus are selected; and for effecting image formation from a small-size transmission-type original such as a 135 size lantern slide, the user selects a film scanning unit that projects the transmission-type original at an enlarged size to scan expose the light-sensitive material and which is located at a predetermined position in the image forming apparatus. In accordance with the present invention, different exposure optics (or units) are selected depending upon the kind of document to be duplicated but, nevertheless, basically the same input means is used and operated to accomplish color and density related image adjustments including the setting of appropriate image forming conditions and the necessary color/density adjustment (the color and/or density adjustment by a manual method).

In the conventional image forming apparatuses of the type contemplated by the present invention which perform image formation with the appropriate exposure optics being selected in accordance with the kind of document to be duplicated, the image forming conditions must be set or the necessary color/density adjustment must be made by different methods depending upon the exposure optics to be used or, alternatively, the method of setting the image forming conditions is not specified in any particular way. Since the operating means and method of performing the necessary color and/or density related image adjustment for image formation are thus different depending upon the kind and size of document to be duplicated (namely, the exposure optics used), the steps of operation for adjustment are very cumbersome and difficult to perform and much labor and time are required to insure that image of high quality can always be formed without regard to the kind and size of document to be duplicated.

On the other hand, the image forming apparatus of the present invention enables color and/or density related adjustments such as the setting of image forming conditions and color/density adjustment to be performed by basically the same input means using basically the same operating method without regard to the kind of document to be duplicated (whether it is a reflection-type or transmission-type original) and its size. Therefore, the user is capable of forming high-quality image in a rapid, easy and consistent manner without requiring cumbersome and difficult steps of operation.

DETAILED DESCRIPTION OF THE INVENTION

Figure 1:
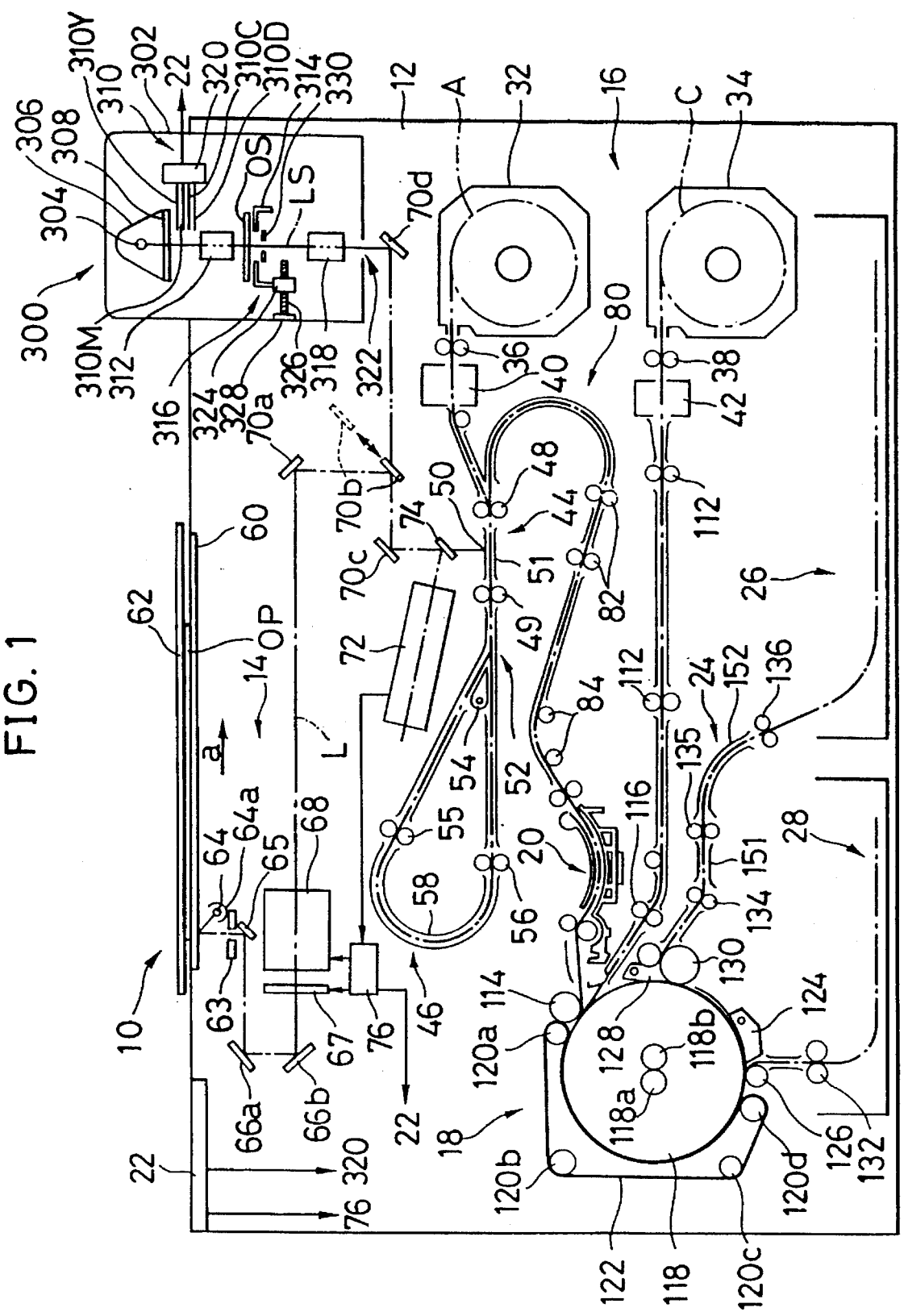
FIG. 1 is a simplified cross-sectional view showing a copier as one embodiment of the image forming apparatus of the present invention.

FIG. 1 shows a copier as one embodiment of the image forming apparatus of the present invention, in which image is recorded on a light-sensitive material that needs thermal development before image is transferred to an image-receiving material having a receiving layer in the presence of an image forming solvent such as water.

The copier shown by 10 in FIG. 1 is capable of copying image not only from ordinary reflection-type originals such as printed matter and photographs but also from transmission-type originals such as 135 size lantern slides and proofs.

The copier 10 contains the following basic components: an exposure unit 14 as inherent exposure optics that is located in the upper part of the housing 12; a light-sensitive material/image-receiving material supply section 16 that is located on a lateral side of the housing 12 (which section is hereunder designated simply as a supply section 16); a thermal development and transfer section 18 that is located on the other lateral side of the housing 12 opposite the side where the supply section 16 is located; a water applicator section 20 that is located between the supply section 16 and the thermal development and transfer section 18; an image-receiving material recovery tray 26; a disposal tray 28 located on the side of the thermal development and transfer section 18 which is downstream the transport of the light-sensitive material; and an operating panel 22 located on top of the housing 12.

The copier 10 is fitted in the upper right portion (as seen in FIG. 1) with a detachable film scanning unit 300 for copying a small-size transmission-type original such as a 135 size lantern slide OS; the unit 300 can be disconnected from the copier 10 if there is no need to use it. For copying a comparatively large transmission-type original OT such as a 4×5 size lantern slide, proof or sleeve, a dedicated light source unit 400 is placed on top of the copier 10 in a predetermined position (see FIG. 4).

The supply section 16 is loaded with two magazines 32 and 34 in position; the magazine 32 is for containing the light-sensitive material A as it is wound on itself, and the magazine 34 is for containing the image-receiving material C as it is also wound on itself. Both magazines 32 and 34 are adapted in such a way that they can be pulled out of the housing 12 toward the operator (directed away from the paper in a direction normal to the transport of the light-sensitive material A).

The magazine 32 is completely shielded from light as it is contained in the housing 12 so as to avoid accidental exposure of the light-sensitive material A to light.

As already mentioned, the light-sensitive material A used in the case shown in FIG. 1 needs thermal development before image is transferred to the image-receiving material C having a receiving layer in the presence of an image forming solvent such as water. Hence, the light-sensitive material A comprises a support that carries on it light-sensitive silver halides, binders, dye donating materials, a reducing agent, etc. In the case shown in FIG. 1, the light-sensitive material A as contained in the magazine 32 is wound on itself in such a way that its light-sensitive surfaces faces down.

The image-receiving material C comprises a support that has a mordant containing dye fixing material coated thereon. The image-receiving material C has a smaller width than the light-sensitive material A and it is contained in the magazine 34 as it is wound on itself in such a way that the surface where image is to be formed faces up.

Located ahead of the magazines 32 and 34 are withdrawing roller pairs 36 and 38 that are in alignment with the exits of the respective magazines. Located further ahead are cutters 40 and 42 for cutting the light-sensitive material A and the image-receiving material C, respectively, to predetermined lengths. It should be mentioned here that the image-receiving material C is cut to a slightly shorter length than the light-sensitive material A in order to insure that the two members can be easily separated after the subsequent steps of thermal development and transfer.

After the cutter 40 was activated, the withdrawing roller pair 36 associated with the light-sensitive material A will rotate in a reverse direction up to a position where it barely grips the leading end portion of the light-sensitive material A so that said portion will not be deteriorated by accidental exposure to light. After the cutter 42 was activated, the withdrawing roller pair 38 associated with the image-receiving material C releases it so that its leading end portion will not be damaged.

Located behind the cutter 40 (the term "behind" as used hereinafter means a position downstream the transport of the light-sensitive material A or the image-receiving material C) is an exposing section 44 and located further behind is a reversing section 46.

The light-sensitive material A that has been withdrawn by the roller pair 36 and which has been cut to a predetermined length by the cutter 40 passes through the exposing section 44 to enter the reversing section 46, where it is turned upside down; the thus reversed light-sensitive material A is transported again into the exposing section 44, where it is exposed to light by means of the exposure unit 14 or the film scanning unit 300 which are to be described in detail hereinafter.

The exposing section 44 is composed of transport roller pairs 48 and 49, an exposure plane forming glass 50 that is located between the transport roller pairs 48 and 49 and which defines both the transport path of the light-sensitive material A and the exposing position, and a presser plate 51 that depresses the light-sensitive material A against the exposure plane forming glass 50.

Stated more specifically, the light-sensitive material A as transported by the roller pairs 48 and 49 passes through the exposing section 44 before it is transported to the reversing section 46, where it is turned upside down so that the light-sensitive surface will face up; the thus reversed light-sensitive material A is transported again into the exposing section 44, where it is subjected to scanning exposure by the exposure unit 14 (or the film scanning unit 300) as it is held between the exposure plane forming glass 50 and the presser plate 51 so that it is controlled to lie at a predetermined exposing position.

The reversing section 46 is composed of a branch guide 52 for splitting the transport path of the light-sensitive material A into an upper and a lower branch, a flapper 54 that determines which branch of the transport path should be followed by the light-sensitive material A when it comes to the branch guide 52, transport rollers pairs 55 and 56, and a guide 58 that forms the transport path along which the light-sensitive material A is reversed.

When the light-sensitive material A is transported past the exposing section 44, the flapper 54 first acts on the lower branch of the guide 52 so that the light-sensitive material A is guided to the upper branch.

The light-sensitive material A thus transported to the upper branch of the guide 52 is directed by the guide 58 as it is turned upside down by means of transport roller pairs 55 and 56. As a result, the light-sensitive material A is reversed in such a way that its light-sensitive surface will face up before it is transported again into the exposing section 44. For the second transport into the exposing section 44, the flapper 54 acts on the upper branch of the guide 52 so that the lower branch will be open.

Located above the exposing section 44 (i.e., in the upper part of the housing 12) is the exposure unit 14 that serves as the inherent exposure optics of the copier 10.

Positioned on top of the housing 12 of the copier 10 are a document platen 60 on which a reflection-type original OP is to be placed and which is typically made of transparent glass, and a document pressing plate 62 that is fitted as required to fix the reflection-type original OP on the platen 60 and which may be removed if there is no need to use it.

When copying the image of a comparatively large-size transmission-type original OT such as a proof or a sleeve, the plate 62 is removed and the dedicated light source unit 400 (see FIG. 4) for illuminating the document OT on the platen 60 is mounted in a predetermined position.

Located below the document platen 60 is a light source unit that is an integral assembly of an exposing light source 64 to be used for copying the image of the reflection-type original OP, a reflector 64a, a mirror 65, and a slit defining member 63 that restricts the width in the scanning direction of light issuing from the light source 64 that has been reflected by the document OP (or that has been transmitted through the document OT).

The light source under consideration moves beneath the platen 60 in the scanning direction indicated by arrow a so that the document OP is illuminated with light from the light source 64.

The light that issued from the light source 64 and which has been reflected by the document OP (or the document pressing plate 62) is then admitted into a mirror unit which is an integral assembly of two mirrors 66a and 66b and by which the light traveling in the optical path L is reflected in predetermined directions. The mirror unit is adapted to move in the same direction as the abovementioned light source unit (below the platen 60) but at one half the speed of the latter.

Figure 2:
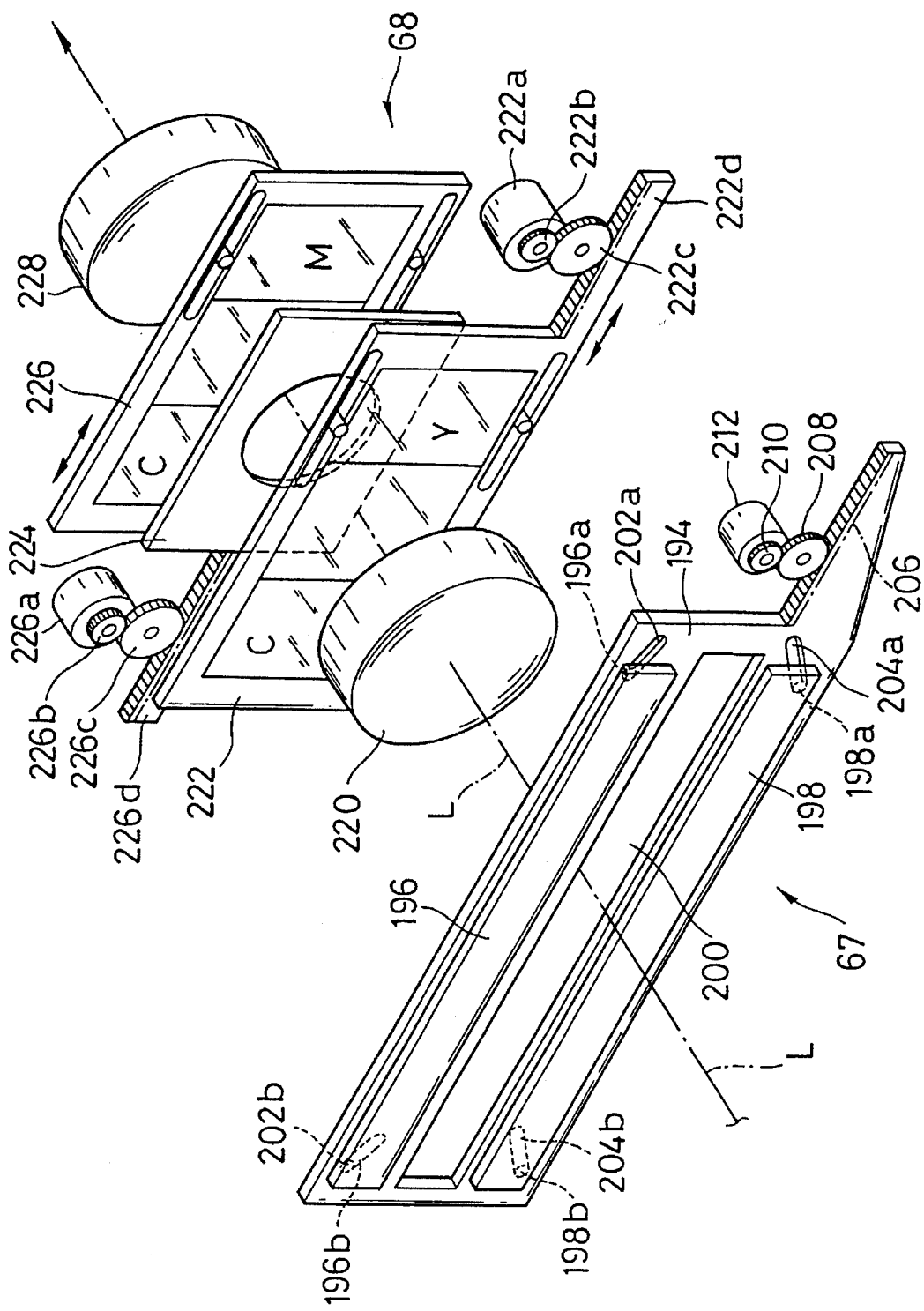
FIG. 2 is a perspective view showing an example of the variable diaphragm and lens unit in the copier shown in FIG. 1.

Located in the optical path L behind the mirror unit are a variable diaphragm 67 and a lens unit 68, the combination of which serves to make exposure, light quality and focus adjustments. FIG. 2 shows an example of the variable diaphragm 67 as combined with the lens unit 68.

The variable diaphragm 67 consists basically of a plate cam 194 having an opening 200 and a pair of diaphragm plates 196 and 198. The plate cam 194 causes the two diaphragm plates 196 and 198 to either approach or depart from each other so that the area of the opening 200 is adjusted to control the quantity of passage of oncoming reflected light in the optical path L.

A rack 206 is formed on the plate cam 194 and it meshes with a stepping motor 212 via gears 208 and 210. Hence, if the stepping motor 212 rotates clockwise, the plate cam 194 will move to the right as seen in FIG. 2 and if the stepping motor 212 rotates counterclockwise, the cam 194 will move to the left.

The plate cam 194 also has inclined grooves 202a and 202b at two top corners, as well as inclined grooves 204a and 204b at two bottom corners. Pins 196a and 196b projecting from the diaphragm plate 196 are in engagement with the grooves 202a and 202b, respectively, whereas pins 198a and 198b projecting from the diaphragm plate 198 are in engagement with the grooves 204a and 204b, respectively.

Each of the diaphragm plates 196 and 198 is fixed by a certain means (not shown) so that they will not move from left to right or vice versa as seen in FIG. 2. However, if the rotation of the stepping motor 212 causes the plate cam 194 to move from left to right or vice versa, the diaphragm plate 196 (or 198) moves in a corresponding vertical direction along the grooves 202a and 202b (or grooves 204a and 204b), whereupon the amount of insertion of the diaphragm plates into the optical path L varies to determine the amount by which the diaphragm 67 is to be stopped down.

The reflected light the effective amount of which has been adjusted by the variable diaphragm 67 and which keeps traveling in the optical path L is then admitted into the lens unit 68.

The lens unit 68 comprises imaging lenses that allow the reflected light from the document OP to focus on the light-sensitive material A and which are combined with light-modifying color filters. Stated more specifically, the lens unit 68, in order from the upstream side of the optical path L, a front lens group 220 (as an imaging lens), a first color filter plate 222, a fixed diaphragm 224, a second color filter 226, and a rear lens group 228 (also an imaging lens).

The first and second color filter plates 222 and 226 are typically made of a transparent glass plate and films of color filter for different colors are evaporated on both sides on the central clear portion of each plate. In the case shown in FIG. 2, the first color filter plate 222 has a cyan (C) and a yellow (Y) color filter whereas the second color filter plate 226 has a cyan (C) and a magenta (M) color filter.

The purpose of these color filter plates is to modify the oncoming reflected light in the optical path L by adjusting the amount in which the color filters Y, M and C are inserted into the optical path L.

The amounts by which the respective color filters Y, and C in the first color filter plate 222 (or the second color filter plate 226) are to be inserted into the optical path L are adjusted by the combination of the following parts: a stepping motor 222a (or 226a) serving as a drive source; a gear wheel 222b (or 226b) provided at an end of the shaft of the motor; a reducing gear wheel 222c (or 226c) that meshes with the gear wheel 222b (or 226b); and a rack 222d (or 226d) that is formed on the first color filter plate 222 (or the second color filter plate 226) and which meshes with the reducing gear wheel 222c (or 226c).

The variable diaphragm 67 and the lens unit 68 are connected to a control unit 76. When setting the image forming conditions or making the necessary color/density adjustment (color and/or density adjustment by a manual method) or on the basis of the result of measurement with an image sensor assembly 72 to be described hereinafter, the control unit 76 controls the diaphragm aperture D and the amounts of insertion of color filters Y, M and C in order to adjust not only the passage of light through the variable diagram 67 but also the modification of the quality of light by the respective color filters Y, M and C (or the quantity of light passing through those filters). Furthermore, the control unit 76 stores the settings of image forming conditions (those conditions which were initially set for the copying of reflection-type original OP and transmission-type original OT) and, on certain occasions such as where the main power supply is switched on or when the operating panel 22 is touched to select either OP or OT as the document to be duplicated, the control unit 76 allows the respective color filters to be inserted by predetermined amounts into the optical path L in accordance with the settings of the image forming conditions and, at the same time, the unit 76 controls the amount by which the variable diaphragm 67 should be stopped down.

The control unit 76 in turn is connected to the operating panel 22, which is touched by the user to set the image forming conditions or make the necessary color/density adjustment by means of the variable diaphragm 67 and the lens unit 68.

Located in the optical path L behind the lens unit 68 are mirrors 70a, 70b and 70c for causing the reflected light to be reflected in a predetermined direction. The oncoming reflected light in the optical path L is further reflected in predetermined directions by those mirrors and keeps traveling in the optical path L until it reaches a predetermined position in the exposing section 44, where it is focused for exposure of the light-sensitive material A in the process of scanning transport.

The mirror 70b is adapted to be movable between two positions depending upon the exposure optics selected (or the kind of document to be duplicated); for image formation using the exposure unit 14 (when copying OP or OT), the mirror 70b takes the position indicated by a solid line in FIG. 1 and for image formation using the film scanning unit 300 (when copying a slide OS), the mirror 70b moves to the position indicated by a dashed line in FIG. 1.

Located behind the mirror 70c is a moving mirror 74 by which the optical path of the reflected light is selectively changed so that it is admitted into either the exposing section 44 or the image sensor assembly 72. In the step of ordinary exposure, the mirror 74 is moved by a known means to a position away from the optical path L; on the other hand, for the adjustment of white balance or in the prescanning step, the mirror 74 moves to the illustrated position so that it is inserted into the optical path L for causing the reflected light to be further reflected towards the image sensor assembly 72.

The image sensor assembly 72 measures the quantity and quality of the reflected light when adjusting the white balance or in the prescanning step and, to that end, the sensor 72 contains three sensors, a red (R) sensor, a green (G) sensor and a blue (B) sensor. One unit of sensor may be employed for each color but, if desired, a total of six photosensors may be used to measure the intensity of light at two wavelengths for each color.

After completion of the step of exposure in the exposing section 44 by means of the exposure unit 14, the light-sensitive material A is fed into the reversing section 80, where it is turned upside down in such a way that the light-sensitive surface will face down. The reversed light-sensitive material A is transported by roller pairs 82 and guided by rollers 84 to enter the water applicator section 20. In the water applicator section 20, the light-sensitive material A for which the step of exposure has been completed is coated with water as an image forming solvent.

Figure 3:
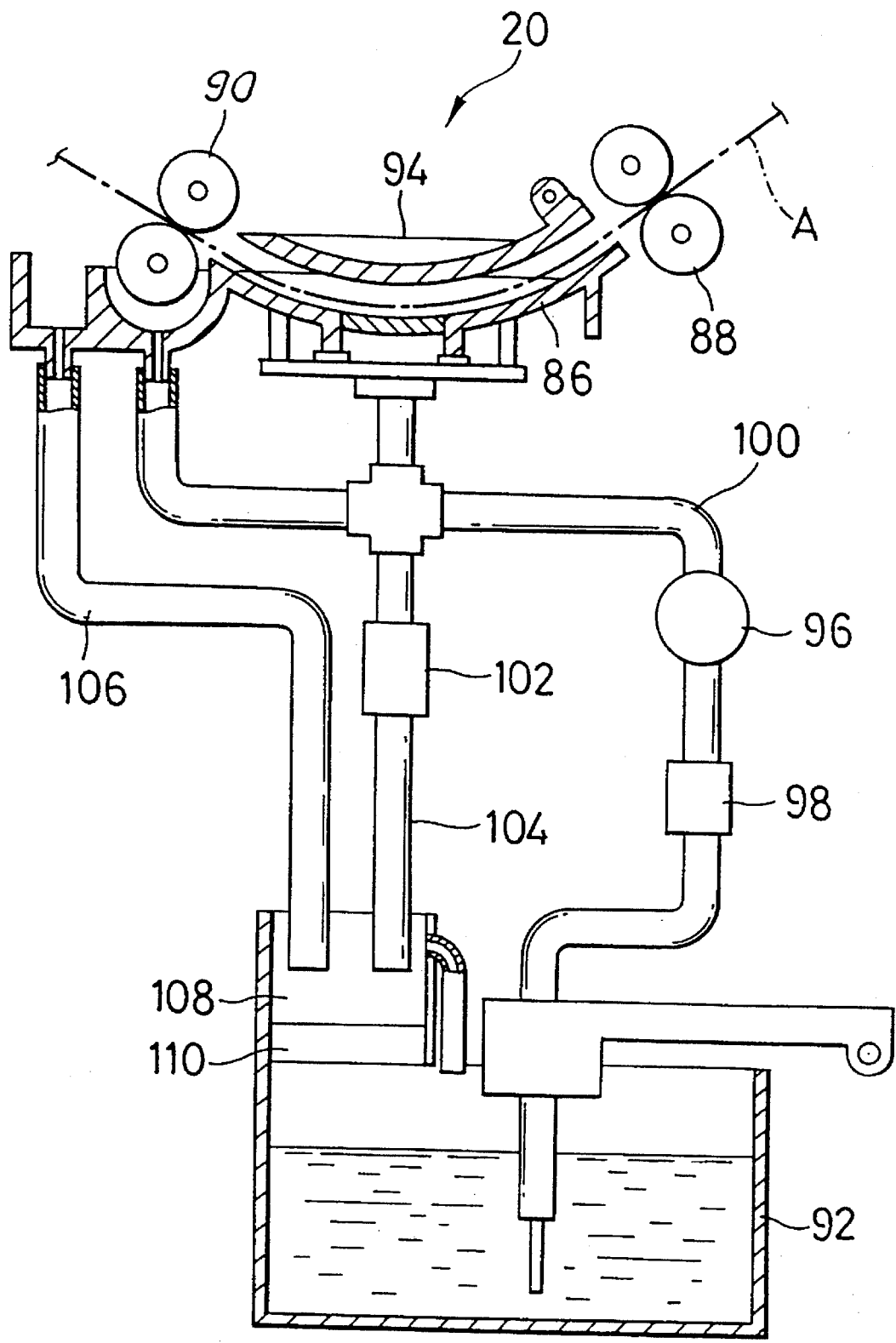
FIG. 3 is a diagrammatic view showing an example of the water applicator section of the copier shown in FIG. 1.

FIG. 3, shows an example of the water applicator section 20.

As shown, the water applicator section 20 comprises basically an application tank 86, a transport roller pair 88 positioned ahead of the application tank 86, a squeeze roller pair 90 positioned behind the application tank 86, and a water replenishing tank 92.

In the case shown, a transport guide 94 for the light-sensitive material A is located in a position where it faces the application tank 86. The light-sensitive material A emerging from the reversing section 80 is transported into the application tank 86 by means of the roller pair 88 and as it is transported between the tank 86 and the guide 94, the light-sensitive material A is coated with water which is an image forming solvent. Thereafter, the light-sensitive material A is freed of excess water by means of the squeeze roller pair 90 and then transported to the subsequent step.

The application tank 86 is connected to a supply line 100 having a pump 96 and a filter 98, so that it is supplied with water from the replenishing tank 92.

The bottom of the application tank 86 is connected to a drain line 104 having a solenoid valve 102. When the normally closed solenoid valve 102 is opened, the water in the tank 86 is drained to the replenishing tank 92.

The application tank 86 is also connected to an overflow line 106, through which excess water in the tank 86 is drained to the replenishing tank 92.

The drain line 104 and the overflow line 106 are adapted in such a way that the end of each line that extends towards the replenishing tank 92 communicates with a water tank section 108 and that water is drained into the tank 92 via a filter 110.

The image forming solvent that can be used in the present invention is in no way limited to water and it may be a mixture of water with a low-boiling point solvent such as methanol, DMF, acetone or isobutyl ketone. The replenishing tank 92 preferably contains not only the image forming solvent but also a defoaming agent.

Referring back to FIG. 1, the thermal development and transfer section 18 is located behind the water applicator section 20.

The image-receiving material C that was drawn out of the magazine 34 in the supply section 16 and which has been cut to a predetermined length by the cutter 42 is transported by a roller pair 112 to enter the thermal development and transfer section 18.

A combining roller 114 is located at the entrance to the thermal development and transfer section 18 for allowing the water-coated light-sensitive material A to be combined with the incoming image-receiving material C in such a way that the material A is offset by about 5 mm ahead of the material C.

A register roller pair 116 is located in the transport path of the image-receiving material C ahead of the combining roller 114, so that it will detect the position of the material C with a sensor (not shown) to insure that the materials A and C are combined in registry with predetermined positions.

The thermal development and transfer section 18 is composed of a heating drum 118 and an endless belt 122; the heating drum 118 contains in it two halogen lamps 118a and 118b each serving as a heating source, and the endless belt 122 is wound around the heating drum 118 and stretched on four belt support rollers 120a, 120b, 120c and 120d. In the section 18, the light-sensitive material A and the image-receiving material C are heated as they are combined together. As a result of this heating operation, the latent image of the light-sensitive material A that has been formed by the step of exposure in the exposing section 44 is rendered visible and the thus developed image is transferred to the image-receiving material C for the development of colors.

The heating halogen lamps 118a and 118b will produce different powers, one outputting about 400 W and the other outputting about 800 W. To heat the drum 118 to a predetermined temperature (ca. 78° C.), both lamps are turned on but during normal operation, only the halogen lamp rated at 800 W is used to heat the drum 118.

The thermal development and transfer section 18 is also fitted with the combination of a first stripping finger 124 and a guide roller 126 that separates the light-sensitive material A from the image-receiving material C and which transports the separated light-sensitive material A into the disposal tray 28, as well as the combination of a second stripping finger 128 and a guide roller 130 that separates the image-receiving material C from the surface of the heating drum 118 and which transports the separated image-receiving material C into the recovery tray 26.

The combination of the light-sensitive material A and the image-receiving material C which has passed through the step of thermal transfer by means of the heating drum 118 and the endless belt 122 is first stripped of the light-sensitive material A by means of the finger 124 and the thus separated light-sensitive material A is guided by the roller 126 towards the disposal tray 28 and thence transported by a roller pair 132 to enter the disposal tray 28.

The heating drum 118 rotates further, whereupon the remaining image-receiving material C is separated from the drum 118 by means of the finger 128 and the thus separated image-receiving material C is guided by the roller 130 towards the recovery tray 26 and thence directed by guides 151 and 152 as it is transported by roller pairs 134, 135 and 136 to enter the recovery tray 26.

As already mentioned, the copier 10 is fitted in the upper right portion of the housing 12 (as seen in FIG. 1) with the detachable film scanning unit 300 which provides exposure optics for copying the image of a small-size transmission-type original such as a 135 size lantern slide OS.

By scanning the slide OS for enlarged projection onto the light-sensitive material A, the film scanning unit 300 produces a copy of the image of OS on the light-sensitive material A as it is enlarged at a magnification of 200–850%. The film scanning unit 300 has the following basic parts contained in the housing 302: a light source section having a light source 304, a reflector 306 and a heat-shield filter 308 arranged along the optical path LS of the projecting light to form a unitary assembly; a filter section 310; a diffusion glass 312; a scanning means 316 for scanning the slide OS as it is held in a predetermined position; and zoom lens 318.

The light source 304 may be of any type that is suitable for color reprography, as exemplified by a halogen lamp and a flash lamp. The reflector 306 causes the light from the light source 304 to be reflected towards the slide OS and is typically composed of a concave reflecting mirror. The heat-shield filter 308 absorbs heat rays and other deleterious components of the light radiated from the light source 304 and transmits only the visible light that is necessary for exposure.

The filter section 310 is composed of three color filter plates, yellow (Y) filter 310Y, magenta (M) filter 310M and cyan (C) filter 310C, a ND filter 310D for adjusting the quantity of light, and control unit 320 for controlling the respective filters to be inserted into the optical path LS of projecting light by predetermined amounts.

The filter section 310 shown in FIG. 1 controls the amounts of insertion of the color filters and ND filter 310D in such a way that the color shades and quantity of projecting light from the light source 304 are adjusted to perform the necessary color and density adjustment for image formation.

In order to set the conditions for image formation (copying) with the film scanning unit 300 or in order for the user to perform color/density adjustments when copying the image of the slide OS and in accordance with such information as the exposure correcting conditions supplied from the image sensor assembly 72, the control unit 320 moves the respective filters by a known moving means such as a rack and pinion using associated pulse motors as drive sources, whereby the amounts of insertion of the filters into the optical path are adjusted. Further, the control unit 320 stores the settings of the image forming conditions (namely, the conditions initially set for copying the slide OS) and, if the slide OS copy mode is selected on the operating panel 22, the respective filters are inserted into the optical path LS by predetermined amounts in accordance with the settings of the image forming conditions.

The control unit 320 is connected to the operating panel 22 fitted as an integral part of the copier 10 and the adjustments of the amounts by which the filters are to be inserted into the optical path LS, namely, the color/density adjustment and the setting of image forming conditions necessary for copying the slide OS, are made on the operating panel 22 as in the aforementioned case of adjustment with the lens unit 68 and the variable diaphragm 67.

The diffusion glass 312 diffuses and mixes the rays of light that has been corrected for colors and adjusted for its quantity, so as to create uniform light that is free from the problem of unevenness in colors and illumination.

The scanning means 316 holds the slide OS in a predetermined position and scans it by movement in synchronism with the transport of the light-sensitive material A in the exposing section 44. Having this function, the scanning means 316 is composed of a scan table 314 for setting up the slide OS in position, a traveling nut 324 fitted beneath the scan table 314, a drive screw 326 threadable with the traveling nut 324, and a motor (drive source) 328 for rotationally driving the drive screw 326.

If the drive screw 326 is rotated by the motor 328, the scan table 314 moves together with the traveling nut 324, whereupon the slide OS on the scan table 314 is moved. The moving speed of the slide OS is one nth of the transport speed of the light-sensitive material A, with n being the copy ratio that is achievable by the film scanning unit 300. The scan table 314 is provided with a slide OS positioning means (not shown) and at least the area of the scan table which corresponds to the slide OS should be formed of a trasparent material or provided with an opening.

A slit defining member 330 is provided near the slide OS in such a way that it forms a slit running at an angle of substantially 90° with respect to the direction in which the slide OS is to move. Thus, as in the case of scanning the document OP in the exposure unit 14, the film scanning unit 300 is also capable of performing slit scan exposure on the light-sensitive material A in the exposing section 44.

The transmitted light from the slide OS which has passed through the slit undergoes magnification to 200%–850% by means of the zoom lens 318 to form an image at the exposing position in the exposing section 44.

The transmitted light from the slide OS which has passed through the zoom lens 318 further passes through an opening 322 formed in the film scanning unit 300. The optical path of this light is deflected by the mirror 70d through an angle of about 90° so that it is brought into agreement with the optical path L of the reflected light from the document OP before it falls on the mirror 70c. As already mentioned, the mirror 70b is retracted to the position indicated by a dashed line in FIG. 1 when the image of the slide OS is to be copied using the film scanning unit 300.

As in the case of the reflected light from the document OP, the transmitted light from the slide OS that has been reflected downward by the mirror 70c is focused at a predetermined exposing position on the light-sensitive material A in the process of transport by the roller pairs 48 and 49, so as to perform slit scan exposure on the material A. The slide OS is moved by the scan means 316 in synchronism with the scan transport speed of the light-sensitive material A, namely, at a speed which is one nth of the transport speed of the material A, with n being the factor of magnification by the projection optics. Hence, the whole image of the slide OS is scanned for exposure on the light-sensitive material A as it is moved over the entire image region.

The copier 10 shown in FIG. 1 is not solely intended for copying the image of an ordinary (reflection-type) document OP and slide OS. If a light source unit dedicated for transmission-type originals is used, the copier can also copy relatively large transmission-type originals such as lantern slides and proofs of the 4×5 size, as well as sleeves.

Figure 4:
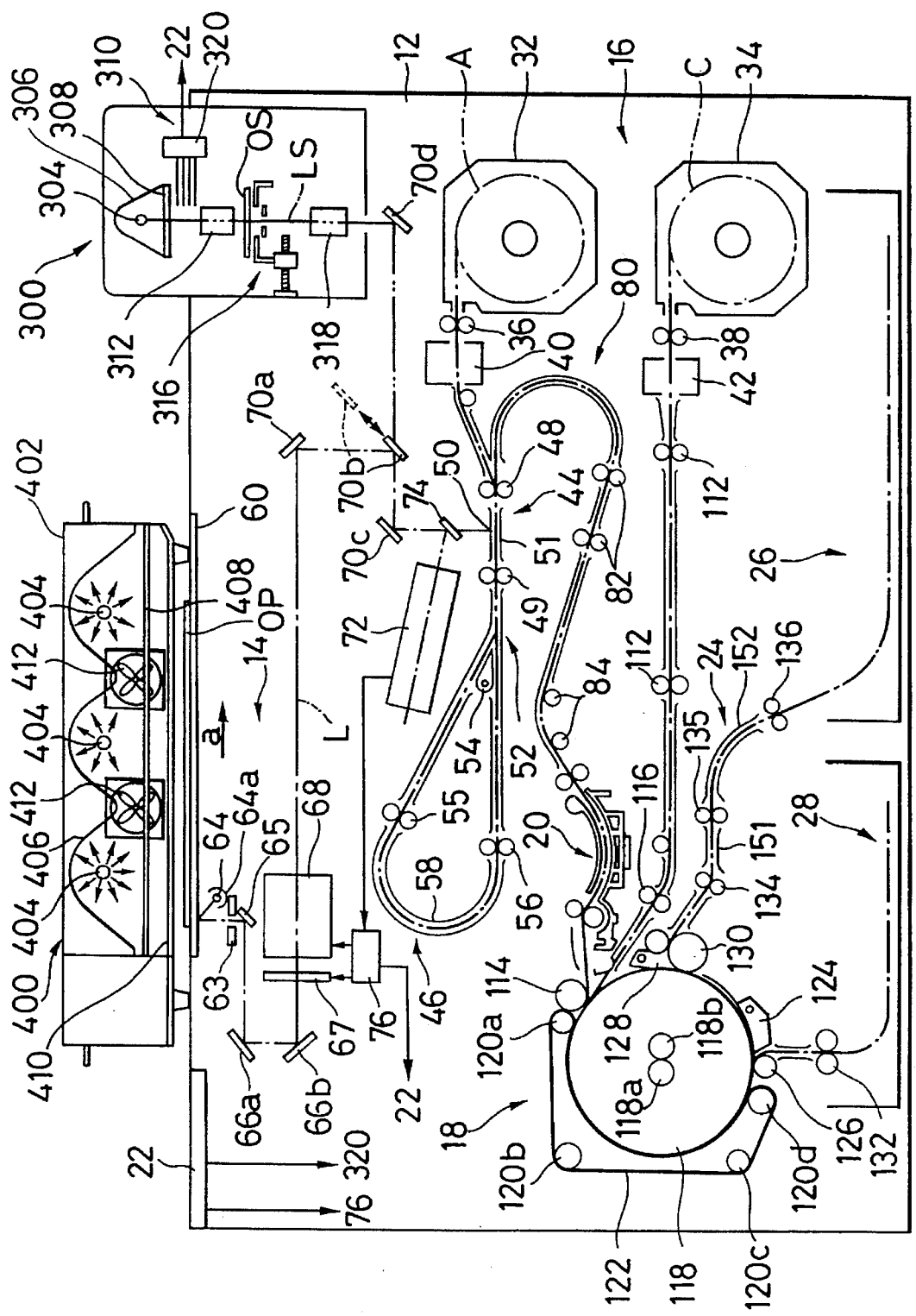
FIG. 4 is a simplified cross-sectional view showing an example of another use of the copier shown in FIG. 1.

FIG. 4 shown an example of the case where a transmission-type original OT is copied using a dedicated light source unit 400 (which is hereunder referred to as a "transmission light source unit").

The transmission light source unit 400 is used as it is placed in a predetermined position on top of the copier 10 in such a way that it covers the platen 60 with the document pressing plate 62 removed. In the copier 10 shown in FIG. 4, the transmission-type original OT placed on the platen 60 is illuminated with light from the unit 400 and the transmitted light is read for scanning by the exposure unit 14 which is the inherent exposure optics, whereupon the image of the original OT is formed on the light-sensitive material A.

The transmission light source unit 400 shown in FIG. 4 comprises the following components: a housing 402; three light sources 404; a reflector 406 by which the light from the light sources 404 is reflected downward (towards the transmission-type original OT); a heat-shield filter 408 that absorbs heat rays and other deleterious components of the light radiated from the light sources 404 and which transmits only the visible light necessary for exposure; a diffusion glass 410 that diffuses the light from the light sources 404 to produce uniform light that is to be admitted into the original OT; and two cooling fans 412 for cooling the interior of the housing 402.

In the transmission light source unit 400, the light issuing from the light sources 404, as well as the light from the light sources 404 that has been reflected by the reflector 406 pass through the heat-shield filter 408 and are rendered uniform by the diffusion glass 408 so as to illuminate the transmission-type original OT placed in a predetermined position on the platen 60 in the copier 10.

Illuminated in this way, the transmission-type original OT is copied by the same method as in the case of copying the reflection-type original OP. Stated more specifically, the light source unit in the exposing unit 14 which is composed of the light source 64, reflector 64a, mirror 65 and slit defining member 63 is moved in the direction indicated by arrow a, so as to scan the transmitted light from the original OT. As already mentioned, the light source 64 is not lit when copying the original OT.

The transmitted light from the original OT passes through the slit formed by the slit-defining member 63 and is reflected in predetermined directions by the mirrors 66a and 66b; thereafter, the light is adjusted for its quantity, colors and focusing position by the variable diaphragm 67 and lens unit 68 and is reflected in predetermined directions by mirrors 70a, 70b and 70c and focused on the light-sensitive material A in the process of transport in the exposing section 44, so as to scan and expose the material A.

The process of copying the reflection-type original OP, slide OS and transmission-type original OT using the copier 10, as well as the film scanning unit 300 or the light source unit 400 is basically implemented by manipulation with the operating panel 22. It should be particularly noted that when operating the copier 10 which is an embodiment of the image forming apparatus of the present invention, the process of adjusting the colors and densities of the image to be formed (copied), or to state specifically, the setting of image forming conditions and the (manual) color/density adjustment, or to state more specifically, the color and/or density related adjustment and setting by means of the variable diaphragm 67 and lens unit 68 in the exposure unit 14, as well as the filter section 310 of the film scanning unit 300, are implemented on the operating panel 22 by procedures that are basically the same irrespective of the kind of document to be duplicated.

Having the design features described above, the image forming apparatus of the present invention enables a desired image to be formed (copied in the case shown) by a consistent and simple operation without regard to the kind of document to be duplicated (or the exposure optics, namely, the exposure unit or any other associated unit, to be employed) and, hence, image of high quality can be easily formed by simple steps of operation without regard to the kind of document to be duplicated.

Figure 5:
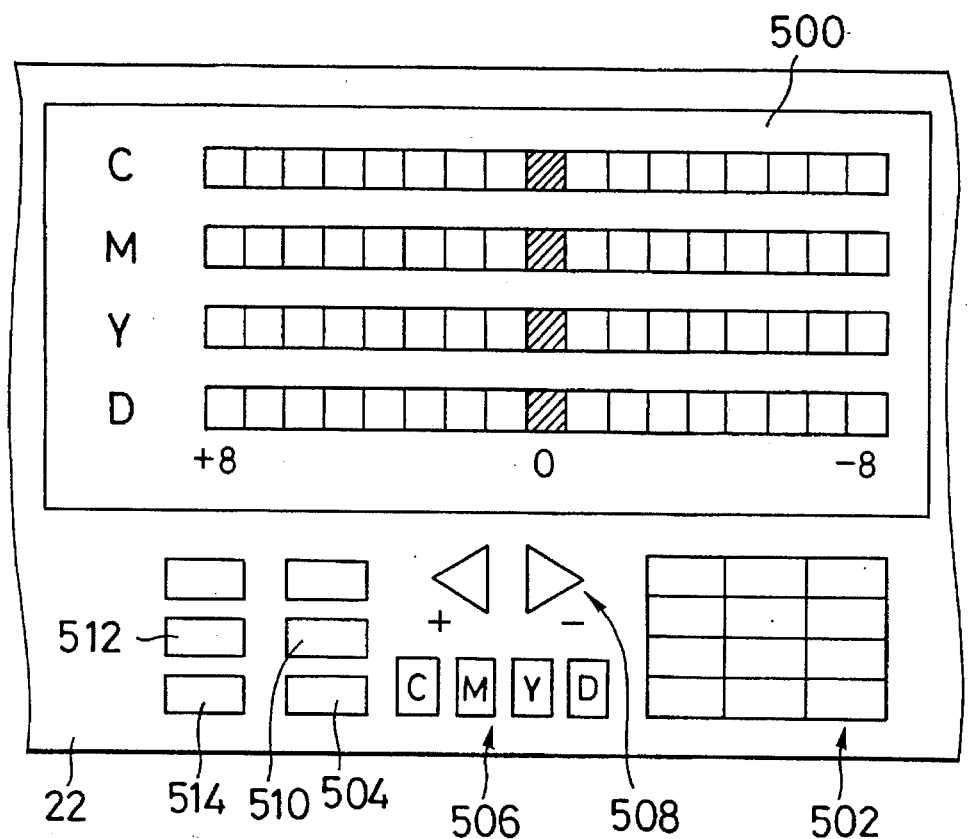
FIG. 5 is a diagram showing conceptually a portion of the operating panel of the copier shown in FIG. 1.

FIG. 5 shown conceptually a portion of the operating panel 22.

As shown, the operating panel 22 comprises a display 500, a tenkey pad 502, a color density MODE button 504, color density SELECT buttons 506, color density ADJUST buttons 508, a document (unit) SELECT button 510, a management MODE button 512, a SET button 514, and other components. As already mentioned, the operating panel 22 is connected not only to the control unit 76 for the variable diaphragm 67 and lens unit 68 (the associated filters) which are fitted in the exposure unit 14 integral with the copier 10 but also to the control unit 320 which is fitted in the filter section 310 of the film scanning unit 300.

Using the operating panel 22, the color/density adjustments of the image to be copied are performed in the following manner.

First, the user places the document of interest in a position appropriate for its kind; if the document is a reflection-type original OP or a transmission-type original OT, he places it in a predetermined position on the platen 60 and if the document is a slide OS, he loads it in a predetermined position on the scan table 314.

The user then depresses the document SELECT button 510 for setting the appropriate kind of document. In the case shown, the kind of document is preset to the reflection-type original OP at the time the main power is tuned on. By depressing the document SELECT button 510 repeatedly, the setting of document type which is presently OP is changed successively to OT (transmission-type original) and OS (slide). Upon another depression of the button, the setting returns to the initial OP and the same cycle is repeated.

If the kind of document to be duplicated is set, the color filters and diaphragm (ND filter) in the unit (exposure optics) are adjusted automatically in accordance with the image forming conditions that are preset (initially set) to comply with the selected document. Stated more specifically, if the document of interest is a reflection-type original OP or a transmission-type original OT, the control unit 76 which is an integral part of the copier 10 is actuated to have the opening of the variable diaphragm 67 adjusted to a predetermined level and to have the respective color filters C, M and Y in the lens unit 68 inserted into the optical path L by predetermined amounts; if the document of interest is a slide OS, the control unit 320 in the film scanning unit 300 is driven to adjust the amounts by which the Y filter 310Y, M filter 310M, C filter 310C and ND filter 310D are to be inserted into the optical path LS.

The insertion of the respective filters into the optical path and the opening of the diaphragm are adjusted in accordance with preset conditions for image formation. If the document to be duplicated is a reflection-type original OP, the opening of the variable diaphragm 67 is adjusted to 50 cc whereas the amounts of insertion of C and M filters in the lens unit 68 are each adjusted to 5 cc. If the document is a transmission-type original OT, the opening of the variable diaphragm 67 is adjusted to 40 cc whereas the amounts of insertion of C and M filters in the lens unit 68 are adjusted to 3 cc and 8 cc, respectively. If the document is a slide OS, the amounts of insertion of M filter 310M, C filter 310C and ND filter 310D in the filter section 310 are adjusted to 10 cc, 5 cc and 70 cc, respectively. The diaphragm is at 0 cc if it is fully open and 1 cc is defined to be equivalent to a change of 0.01 in terms of log E.

The process of setting the image forming conditions will be described later in this specification in greater detail.

To make the color/density adjustment, the user depresses the color density MODE button 504 so that the apparatus is brought into a color density adjustment mode.

When the color density MODE button 504 is depressed, the display 500 displays adjustment parameters as shown in FIG. 5 that consist of C, M and Y colors and density D. In the case shown, each parameter can basically be adjusted in ±8 stages, with one stage permitting an adjustment of 3 cc for each color filter and 4 cc for ND filter.

Then, the user selects either one of the color density SELECT buttons 506 to determine which parameter should be adjusted, either color of Y, M and C or density D. The user then depresses either the plus (+) or minus (−) color density ADJUST button 508 to adjust the selected color or density.

When either one of the density ADJUST buttons 508 is depressed, the color and density adjusting means that is associated with the kind of document as already selected by the document SELECT button 510 is actuated. If the document is a reflection-type original OP or a transmission-type original OT, the control unit 76 is actuated to adjust the opening of the variable diaphragm 67 or the amount of insertion of a selected color filter in the leans unit 68. If the document is a slide OS, the adjusting unit 320 is actuated to adjust the amount of insertion of Y, M and C color filters or ND filter.

It should be noted here that if the document is a transmission-type original such as OT or OS, the range for the overexposure or underexposure of documents is broader than in the case where the document is a reflection-type original OP. Under the circumstances, it sometimes occurs that the same adjustment parameters as used for reflection-type originals are insufficient to accomplish satisfactory density adjustment. This problem could be solved by designing an apparatus that uses a sufficient number of density adjustment parameters to enable satisfactory duplication of transmission-type originals. However, many of the documents that need be duplicated today are reflection-type originals such as printed matter and photographs and, therefore, if the number of adjustment parameters is increased to permit the duplication of transmission-type originals, a need arises to control and guarantee the performance of the apparatus to an extent that is not usually required in the normal case and this eventually results in a higher cost of the apparatus. Another approach for copying an underexposed or overexposed document would be by altering the settings of the image forming conditions which are described hereinafter; however, this method requires very cumbersome steps of operation.

Under these circumstances, the copier 10 shown in FIG. 4 solves the problem by taking a more preferred approach, according to which the adjustable range of density parameters is made broader in the case where the kind of document selected by the document SELECT button 510 is a transmission-type original such as OT or OS than in the case where a reflection-type original OP is to be duplicated. In the case shown in FIG. 4, the adjustable range for reflection-type originals (as is normally the case) covers ±8 stages, which means that density adjustment can be made over the range ±32 cc. According to the present invention, the copier 10 is so adapted that when duplicating a transmission-type original, the adjustable range of parameters is doubled to permit density adjustment in ±16 stages covering the change of ±64 cc. This design eliminates the unwanted increase in the cost of the apparatus and yet permits image formation from a transmission-type original by simple steps of operation.

Figure 6:
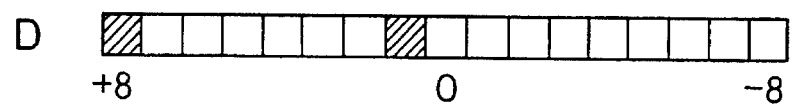
FIG. 6 is a diagram showing conceptually an example of the parameter for density adjustment on the operating panel of FIG. 5 in the case of forming image from a transmission-type original.
Figure 6:
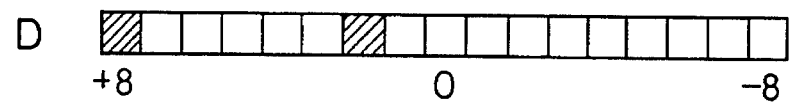

To expand the range of parameters for density adjustment that can be effected by the copier 10 (or operating panel 22) shown in FIG. 4, the display may be returned to the first stage if the necessary adjustment exceeds 8 stages as shown in FIG. 6, with the ninth stage being realized by 8+1 (FIG. 6a) and the tenth stage by 8+2 (FIG. 6b). If the parameters for density adjustment are to be displayed in digital quantities, the displayed quantities may be rendered variable to the extent to which the range of parameters is expanded.

In order to insure that a color image having a color and density that are faithful to the image of the document is formed at all times, the image forming apparatus of the present invention such as the copier 10 shown in FIG. 1 or 4 is set to satisfy the appropriate image forming conditions, namely the conditions for color balance and density that are capable of reproducing an image faithful to the image of a color original and this setting operation is performed at various times such as when installing the image forming apparatus or when replacing the light-sensitive material and/or the image-receiving material and the developing material. If desired, the setting operation may be performed periodically after system installation. Again, the image forming conditions necessary for the operation of the copier 10 of the present invention are set by means of the operating panel 22 without regard to the kind of document to be duplicated (or the unit to be used, namely, the exposure optics).

Before setting the appropriate image forming conditions, the user forms an index copy image by copying either one of the reference charts preset for the different kinds of document or one of the originals that are to be copied most frequently as exemplified by a portrait or scenic picture.

After forming the index copy image, the user depresses the management MODE button 512 and then touches the tenkey pad 502 to enter a key numeral, say 70, whereby the copier 10 is brought into an image forming condition set mode (which is hereunder referred to as a "/condition set mode"). As in the aforementioned color density adjustment mode, the display 500 on the copier 10 in the condition set mode displays the adjustment parameters (C, M and Y colors and density D) as shown in FIG. 5.

The user then depresses the document SELECT button 510 and, as in the color density adjust mode, selects the kind of document to be duplicated, in other words, the exposure optics for setting the image forming conditions. If the document is a reflection-type original OP or a transmission-type original OT, the exposure optics to be selected are the variable diaphragm 67 and the lens unit 68 in the exposure unit 14 which is inherent in the copier 10; if the document is a slide OS, the filter section 310 of the film scanning unit 300 is selected.

The selection of document type completes the preliminary steps for the setting of image forming conditions. Then, as in the mode of color/density adjustment, the user, who is looking at the index copy image, depresses either one of the color density SELECT buttons 506 to determine as to whether either one of the Y, M and C color filters or the diaphragm should be adjusted. In accordance with the specific determination made, the user depresses either the "plus" or "minus" color density ADJUST button 508 so as to control the amount by which the selected filter is to be inserted or the amount by which the quantity of light is to be adjusted with the diaphragm.

The parameter to be adjusted during the process of setting the image forming conditions corresponds to the kind of document that has been selected by depressing the document SELECT button 510. If the document to be duplicated is a reflection-type original OP or a transmission-type original OT, the control unit 76 is actuated to adjust the opening of the variable diaphragm 67 or the amount by which the selected color filter in the lens unit 68 is to be inserted. If the document is a slide OS, the control unit 320 in the filter section 310 is actuated to adjust the amount by which either one of the Y, M and C color filters or the ND filter is to be inserted.

When the adjustment of the Y, M or C color filter and the variable diaphragm 67 or the ND filter 310D has been performed in the manner described above, the user depresses the SET button 514 to complete the process of setting the image forming conditions. The thus set conditions determine the image forming conditions in accordance with the kind of document to be duplicated in subsequent cycles of image formation (image copying) and in response to the start-up of the image forming apparatus.

The foregoing description concerns the process of manual operation for the setting of image forming conditions. However, it should be noted that this is not the sole case for the image forming apparatus of the present invention and it may be adapted to be capable of setting the image forming conditions automatically by copying the image of the reference chart specified for each different kind of document and then reading the copied image with a color density sensor assembly. In this case, the color density sensor assembly may be located near the guide 151 downstream of the thermal development and transfer section 18.

When setting the image forming conditions, the user brings the copier into a mode for the setting of image forming conditions in the same manner as described above in connection with the manual operation; he then selects the kind of document to be copied and forms the copied image of the relevant reference chart. Subsequently, the light-sensitive material A having the exposed image of the reference chart is coated with water in the water applicator section 20, combined with the image-receiving material C in superposition, and transported into the thermal development and transfer section 18, where it is subjected to thermal development and image transfer. Thereafter, the light-sensitive material A is stripped from the image-receiving material C and transported to the disposal tray 28, whereas the material C carrying the copied image is transported by guide rollers to be directed to the recovery tray 26. As the image-receiving material C flows down toward the recovery tray 26, the image on said material C is read with the color density sensor assembly located near the guide 151.

The image information read by the color density sensor assembly is forwarded to a processor, in which the amounts for adjustment of the respective color filters and the diaphragm (ND filter) are computed in accordance with the thus read image formation. In response to this computation, the variable diaphragm 67 and the color filters in the lens unit 68 or the color filters and diaphragm in the filter section 310 are controlled appropriately to provide new settings of image forming conditions.

The image forming apparatus of the present invention has been described in detail on the foregoing pages with particular reference being made to the preferred embodiments shown in the accompanying drawings; however, it should be noted that these are not the sole examples of the present invention and that it is applicable to various types of image forming apparatus such as an image forming apparatus that relies upon a wet development process using a silver halide photographic material, an image forming apparatus that uses a heat- and pressure-sensitive photographic material, and an electrophotographic image forming apparatus. Depending upon the type of light-sensitive material (e.g. a silver halide photographic material, pressure-sensitive photopolymeric material, heat-processable light-sensitive material or a heat-sensitive photographic material) or image-receiving material used, the image forming apparatus of the present invention may be furnished with any processors that are necessary for image formation, such as an exposure unit, a processing bath assembly comprising a developing bath, a fixing bath and a washing bath, a pressure transfer unit, a thermal development unit, as well as a charging unit, an exposure unit and a development unit that may be used as appropriate in accordance with the electrophotographic light-sensitive material or photoreceptor to be used. When the image forming apparatus of the present invention is to be used in electrophotography, the charging conditions, exposing conditions and development conditions can be set as image forming conditions.

If desired, the image forming apparatus of the present invention may be implemented as a color printer, It should also be noted that the method of development is in no way limited to scan exposure with the light source being moved as in the cases shown in the accompanying drawings and that other applicable methods include scan exposure with the document platen being moved, as well as real exposure.

Needless to say, the image forming apparatus of the present invention is in no way limited to the cases described on the foregoing pages and that various modification and improvements can be made without departing from the spirit and scope of the invention.

As described on the foregoing pages, the image forming apparatus of the present invention enables color and/or density related adjustments such as the setting of image forming conditions and color/density adjustment to be performed by basically the same input means using basically the same operating method without regard to the kind of document to be duplicated (whether it is a reflection-type or transmission-type original) and its size; therefore, the user is capable of forming high-quality image in a rapid, easy and consistent manner without requiring cumbersome and difficult steps of operation.

What is claimed is:

1. An image forming apparatus for duplicating an image of an original document, comprising:

an imagewise exposing section having a plurality of exposure optics defining a plurality of optical paths for selective use depending upon whether the .original document is a reflection-type or a transmission-type original;

a light-sensitive material feed section where a light-sensitive material is fed to a predetermined position for imagewise exposure;

a developing section where the exposed light-sensitive material is subjected to a development process;

input means for inputting by the user the kind of document to be duplicated and for allowing the user to perform color and density related adjustments during image formation by means of the selected exposure optics selected in accordance with the kind of document;

a plurality of light filters responsive to said input means for being inserted into the optical path of the selected exposure optics by predetermined amount depending upon the kind of document to be duplicated; and a variable diaphragm, responsive to said input means, an opening of which is adjusted to be a predetermined level depending-upon the kind of document to be duplicated.

2. An image forming apparatus according to claim 1, wherein said exposure optics is triplex and consists of the following three types:

inherent exposure optics that is composed of a light source for reading a reflection-type original and imaging optics with which the light issuing from said light source that has been reflected by said reflection-type original is focused on the light-sensitive material;

exposure optics for transmission-type originals that has a projecting light source for reading a transmission-type original and projecting optics with which the light issuing from said light source that has passed through said transmission-type original is focused on the light-sensitive material; and exposure optics that employs an illuminating light source for reading the transmission-type original and the imaging optics which is part of said inherent exposure optics.

3. An image forming apparatus according to claim 1, wherein the range of color and/or density related adjustment by said input means is variable with the kind of document to be duplicated.

4. An image forming apparatus according to claim 1, wherein said input means is configured to receive a single set of at least one of color and density related adjustments, said adjustments being implemented by a respective one of said plurality of exposure optics depending upon whether said original document is a reflection-type or transmission-type original.

\* \* \* \* \*